March 2, 1954  W. DUBILIER  2,671,157
MEANS FOR MANUFACTURING METALLIZED ELECTRICAL CAPACITORS
Filed June 25, 1951  3 Sheets-Sheet 1

INVENTOR.
WILLIAM DUBILIER.
BY
ATTORNEY.

March 2, 1954 W. DUBILIER 2,671,157
MEANS FOR MANUFACTURING METALLIZED ELECTRICAL CAPACITORS
Filed June 25, 1951 3 Sheets-Sheet 2

INVENTOR.
WILLIAM DUBILIER.
BY
ATTORNEY.

March 2, 1954

W. DUBILIER 2,671,157

MEANS FOR MANUFACTURING METALLIZED ELECTRICAL CAPACITORS

Filed June 25, 1951

INVENTOR.
WILLIAM DUBILIER.
BY

ATTORNEY.

Patented Mar. 2, 1954

2,671,157

UNITED STATES PATENT OFFICE 2,671,157

MEANS FOR MANUFACTURING METALLIZED ELECTRICAL CAPACITORS

William Dubilier, New Rochelle, N. Y., assignor to Cornell-Dubilier Electric Corporation, South Plainfield, N. J., a corporation of Delaware Application June 25, 1951, Serial No. 233,314

12 Claims. (Cl. 219—19)

The present invention relates to methods of and means for manufacturing electrical capacitors of the type comprising a single strip of metallized paper or equivalent flexible dielectric material wound on a mandrel into a convolute spiral unit, said strip having been patterned preparatory to the winding thereof into the final capacitor unit by electrically burning away or evaporating a portion of the metal coating along a wavy or zig-zag line of progressively increasing pitch, in such a manner that successive electrode portions of the coating on opposite sides of the insulating zig-zag line are located in substantial registry one above the other in the rolled final unit, so as to effectively cooperate as electrodes of opposite polarity of the capacitor.

In a method of this type of manufacturing electrical capacitors heretofore employed, the branding or patterning is usually effected by passing the metallized strip, preparatory to its winding into the final capacitor unit, over a wheel provided on its periphery with a raised portion or pattern of the required zig-zag shape, and applying a suitable electric potential difference between the wheel and metal coating of the paper base or other insulating strip.

It will be appreciated that this known method requires the use of a different patterning wheel for each size or type of capacitor and, furthermore, that the wheels become impracticable for the larger sizes of capacitors, owing to the fact that the wheels necessary will become too bulky and unwieldy to use and incidentally also very costly to manufacture.

The present invention has for its primary object to effect improvements in the known methods of patterning a metallized insulating strip, preparatory to its winding into a capacitor unit, whereby the larger sizes of capacitors having relatively high capacitance values can be readily manufactured.

Another object is to enable the capacitance value of a capacitor of the above type to be controlled roughly during the patterning of the metallized strip, to thereby render it unnecessary to provide a patterning wheel for each size of capacitor.

Still another object is to control the capacitance within a relatively close tolerance and by a simple expedient during the patterning operation.

The invention will be better understood from the following detailed description of a few practical embodiments considered in conjunction with the accompanying drawings, forming part of this specification and wherein.

Like reference characters identify like parts throughout the different views of the drawings.

Figure 1:
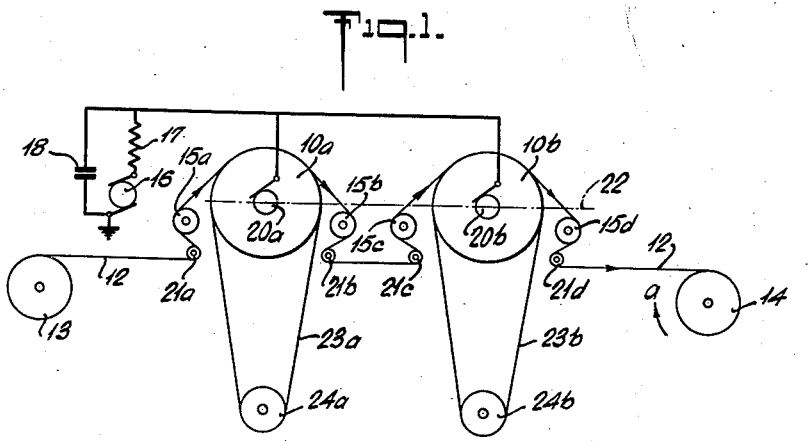
Figure 1 illustrates diagrammatically a simple patterning apparatus comprising a pair of patterning wheels and constructed in accordance with the principle of the invention.

While the invention will be described in the following with specific reference to metallized paper capacitors, the term metallized paper is intended to include other flexible insulating materials, such as synthetic plastics, coated with a thin metallic layer in any suitable manner.

With the foregoing and further objects in view, as will become apparent hereafter, a method of manufacture according to one feature of the present invention comprises passing a single strip of metallized paper successively over the shaped peripheries of two or more patterning or branding wheels each of which acts electrically to burn away or evaporate a portion of the metal coating along a zig-zag line of progressively increasing pitch, the individual wheels being caused to act simultaneously or sequentially on different parts of the length of the strip. By the proper design of said zig-zag patterns of the wheels, successive electrode portions of the coating on opposite sides of the demetallized zig-zag line will be located in substantial registry one above the other in the final capacitor unit obtained by winding the patterned strip into a convolute spiral, said electrode portions being interconnected alternately in two groups constituting the poles of the capacitor.

The progressive increase in pitch of the demetallized zig-zag line continues from wheel to wheel, in such a manner that, if, for example, there are $n$ wheels of equal diameter, the resultant demetallized zig-zag line on the strip will be equivalent to a line which would be produced by a single wheel of $n$ times the periphery or diameter and having a raised peripheral zig-zag pattern or projection of progressively increasing pitch throughout.

It is thus possible to effect a coarse adjustment of the capacitance value of the capacitor by varying the number of patterning wheels in effective use. Risk of short-circuiting electrode portions, connected to opposite poles of the capacitor, owing to inaccurate registration of the patterns produced by two consecutive wheels, may be avoided by removing or burning away a small area of the metal coating at the end of the pattern produced by one wheel and/or at the beginning of the pattern produced by the next following wheel.

The operation or control of the individual wheels may be effected by interposing a mask or masks between the wheel peripheries and the metallized strip to be patterned, by interrupting the electric current supply to the wheels by means of a suitable switching arrangement, or by mechanically separating the metallized strip from the peripheries of the wheels. These controls may be used individually or in combination, to cope with any existing conditions and requirements in producing a final patterned strip suitable for producing a capacitor of desired size or capacitance.

A further feature of the present invention relates to a method of adjusting the capacitance value of a capacitor produced by winding a single metallized and patterned strip of the type referred to above. According to this feature, the patterning is rendered ineffective over a length of the strip dependent upon the desired adjustment by burning away a portion of the coating along a line which lies substantially parallel to the length of the strip and intersects the demetallized zig-zag line, so that there will be no overlap or effective capacitance in such a part of the strip between the electrode portions connected to the opposite poles of the capacitor.

Referring more particularly to Figure 1 of the drawings, numerals 10a and 10b represent two patterning or branding wheels, 12 is a web or strip of metallized paper passing from a supply roll 13 to a winding mandrel or take-up roll 14 over the peripheral surfaces of the wheels 10a and 10b. With the arrangement indicated in the drawings, the metallized surface of the paper is downwards so that it is in contact with the outer periphery of the wheels 10a and 10b and in passing over guide rollers 15a, 15b, 15c and 15d makes contact with the wheels en route.

In the preferred embodiment of the apparatus, the rollers 15a, 15b, 15c and 15d are advantageously connected to ground or the frame of the machine and the patterning wheels 10a and 10b are mounted in insulating material or bushings so that they may be connected to a high tension side of a voltage source 16, such as a direct current voltage generator or rectifier power supply, through a suitable high ohmic limiting resistance 17 and by way of slip rings 20a and 20b and sliding brushes or the like, to obtain the requisite burning potentials between the pattern on the wheel surfaces and the metallized coating on the strip 12. The low tension side of the source 16 is shown grounded or connected to the frame of the machine to close the electric circuit and both the generator 16 and limiting resistance 17 are suitably by-passed by a capacitor 18, in a manner customary with branding or demetallizing devices of this type. The auxiliary rollers 21a, 21b, 21c and 21d serve to maintain the paper strip 12 in close contact with the surfaces of the rollers 15a, 15b, 15c and 15d, which in turn serve to provide adequate contact between the raised patterns of patterning rollers 10a and 10b and the metallized coating.

Suitable driving means (not shown) are provided, whereby the strip 12 is pulled from left to right as indicated by the arrows $a$ in the drawing. For this purpose, any convenient drive may be employed, such, for example, as driving the take-up roller 14 by an electric motor or passing the strip 12 between separate friction or driving rollers, whereby it is pulled along at a constant speed. In addition, the patterning wheels 10a and 10b may also be driven to assist the paper in its travel. In any case, the wheels 10a and 10b are preferably mechanically coupled together by a chain, gearing, or the like as indicated by the dot-dash line 22, to insure that the wheels rotate continuously and in synchronism with one another without any risk of slipping in their relative position with respect to each other.

Figure 2:
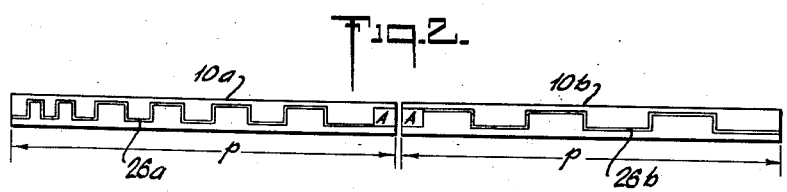
Figure 2 shows the patterning wheels of Figure 1 having their peripheral surfaces developed into a plane.
Figure 4:
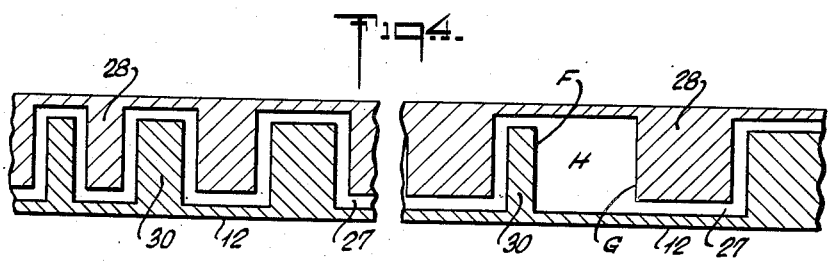
Figure 4 shows a portion of a patterned paper strip obtained by means of apparatus according to Figures 1 to 3.

Figure 2 shows the periphery of the wheels 10a and 10b developed into a plane, the raised portions or projections 26a and 26b, respectively, forming a zig-zag pattern corresponding to the zig-zag line to be burned upon the strip 12, to produce a demetallized or patterned strip as shown in Figure 4 suitable for direct winding upon a mandrel to produce a convolute capacitor unit. As shown in the figure, each patterning wheel 10a and 10b has a zig-zag projection on its periphery 26a and 26b, respectively, the pitch of which varies progressively along the length $p$ of the periphery of each wheel. While other shapes may be used, the zig-zag line conveniently is of rectangular form as shown in the drawing, i. e. consisting of a line running along one side of the periphery and then turning at right angles across the width of the periphery where it again turns at right angles along the other side and then back again to the first side and so on. The rate of variation of the pitch of the zig-zag line depends on the thickness of the paper and the size of the first electrode (28 or 30, Figure 4) of the pattern being chosen to suit the periphery of the mandrel on which the capacitor is to be wound, the arrangement being such that the successive cycles of the zig-zag path burned away from the metal coating of the strip will be accurately superimposed on one another in the wound or finished capacitor. The progression of pitch of the zig-zag line continues from wheel to wheel, so that if the peripheries of the wheel are developed into a plane and placed end to end, as shown in Figure 2, the pitch of the zig-zag will progressively increase from the beginning of the first wheel to the end of the last wheel.

In other respects, the wheels are all similar to one another and preferably of the same size. Each wheel is made of conducting material and has an insulating bushing so that the wheel peripheries are insulated from ground or from the frame of the machine. The wheels are geared together or otherwise mechanically interconnected to insure that they always rotate in synchronism with one another.

Figure 3:
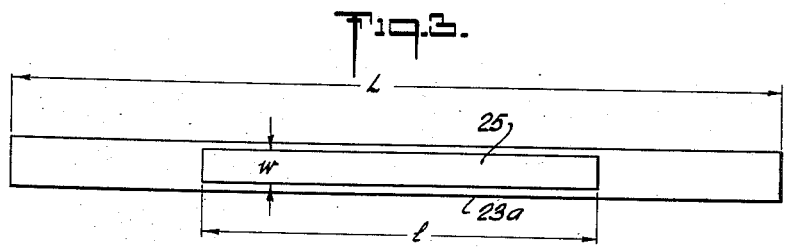
Figure 3 shows one of the masks of Figure 1 developed into a plane.

Around the surfaces of the wheels 10a and 10b and between those surfaces and the metallized strip 12 a mask or stencil 23a and 23b, respectively, is arranged, preferably one around each wheel and independently of the other. In the arrangement shown, the mask 23a passes around the surface of wheel 10a and around a guide roller 24a in the form of an endless loop. Similarly, the mask 23b passes around the wheel 10b and the guide roller 24b. The masks 23a and 23b may consist of insulating strips, such as paper, synthetic plastic, etc., joined together to form a loop having openings 25 cut therein, as shown in Figure 3 which shows the mask 23a developed into a plane. The length $l$ of the opening 25 is arranged to be closely equal to the periphery $p$ of the wheels and the width $w$ of the opening 25 is made equal to the width of the patterned surface of the wheels. The slots are so located in the masks, that, as the wheels rotate, the two ends of a slot will register exactly with the beginning and end of the zig-zag pattern of the respective wheel periphery. Alternatively, if preferred, a single mask may be used with all the wheels instead of one mask for each, such single mask being so arranged and guided that the single slot reaches each of the wheels in turn at exactly the right moment.

The overall length L of the masks 23a and 23b is arranged to be an exact multiple of the periphery $p$ of the wheels, i. e. $L=np$, wherein $n$ represents the number of the wheels used. Thus, when using two wheels, as shown in Figure 1, the patterned surface of the wheels will all be exposed during one revolution and will be entirely covered during the next revolution and exposed again during the third revolution, and so on.

In other words, with the arrangements shown comprising two patterning wheels, the length L of the mask must be made equal to twice the periphery $p$ of the wheels and if three such wheels are used in tandem, the length of the mask should be three times said periphery. With such an arrangement, when the paper strip 12 is drawn from left to right with rotation of the wheels 10a and 10b and the appropriate voltages applied between the contact rollers or metal coating and the insulated wheels, a continuous pattern, Figure 4, on the surface of the wheels will be burnt into the surface of the metallization on the paper base equal to that of the length of the pattern, starting from the small electrodes and increasing to the largest required along the length of the metallized strip.

Referring more specifically to the arrangement according to Figure 1, the cut-out portions 25 of the masks 23a and 23b are advantageously arranged in phase or registry, in such a manner that the starting points of the patterns 26a and 26b on the wheels 10a and 10b are exposed in synchronism to the metallized surface of the strip 12, whereby to effect a simultaneous burning of the respective patterns or sections upon sequential portions or lengths of the strip and to result in a continuous demetallized zig-zag line during a single revolution of the wheels 10a and 10b. During the next revolution, both wheels 10a and 10b will be covered or masked by the solid portions of the masks 23a and 23b, thus advancing the strip 12 by a length equal to the periphery $p$ to a position ready for starting a new patterning cycle, provided the wheels 10a and 10b and the strip 12 are so arranged that the length of the strip between successive wheels substantially equals the periphery $p$.

In order to provide completely demetallized leader and trailer sections at the beginning and end of the complete pattern, the beginning of pattern 26a and the end of pattern 26b on the wheels may be provided with solid projecting portions (not shown), in a manner readily understood.

If more than two patterning wheels are used with the masks having a length equal to $n$ times the periphery $p$, as pointed out above, then a length of $n$ times the periphery $p$ of one wheel will be patterned during the first revolution of the wheels, while the strip will be advanced by a distance $n-1$ times the periphery $p$ during the next $n-1$ revolutions, to be ready for the next patterning cycle or operation. In this manner, complete electrode patterns, each comprising a number of fractional portions or sub-patterns produced by a number of separate patterning wheels may be produced, each complete pattern adjoining the preceding pattern and serving for winding a capacitor of given type or capacitance, in a manner readily understood from the foregoing.

It is also possible to burn the partial or sub-patterns of a complete electrode pattern in succession, instead of simultaneously, by suitably staggering the openings in the masks or by a corresponding design of the switching mechanism controlling the application of the burning potential to the patterning wheels. In this case, an unburned length is obtained between successive complete patterns which may be completely demetallized by an auxiliary electrode to serve as clear leading or trailing sections of the strips wound into individual capacitor units.

Difficulty is sometimes experienced in securing exact synchronism between the finish of the partial or sub-pattern of one wheel and commencement of the sub-pattern of the next. If the space between the patterns is kept to small limits, it is not very material whether the end of the second sub-pattern falls upon the end of the first or not, provided that the metallization is burned away between the two patterns to an extent, to prevent it acting as a short-circuit between the electrodes of opposite polarity in the finished capacitor.

Thus, in Figure 4, which represents a patterned paper strip 12 with the zig-zag line 27 burnt in the metallization, leaving successive electrodes 28 and 30 of opposite polarity and increasing width starting as indicated from the left-handed side of the strip, the metal coating is shown removed or burnt at the termination of the pattern of the first wheel at F and before the commencement of the pattern from the next wheel at G, to leave a free space and to prevent short-circuits between electrodes 28 and 30 of opposite polarity due to lack of complete registry of the ends and beginnings of the pattern of adjacent wheels. This can be effected by finishing the pattern on each wheel or by beginning the next wheel by a blank portion or both, as shown at A, Figure 2, which blank portion or portions act to burn away the metallization entirely to produce a free space H as shown in Figure 4. Alternatively, a separate auxiliary electrode may be provided between the main wheels 10a and 10b which serves to burn away the intervening portion H at the appropriate place by control of the electric supply at the appropriate moment.

As indicated above, if three patterning wheels are used, the length of the masks should be made three times the periphery $p$ of each wheel, but if more than three wheels are required to give a sufficient length of patterned paper, then, by choosing an even number of wheels, the masks on each of them can be kept down to double the periphery p of a single wheel and switching means operating in synchronism with the wheels may be arranged to connect or disconnect the wheels to or from the electric supply at the appropriate intervals of time. Thus, in the case of four wheels, the masks and switching device cooperate so that three spaces are left between each section of pattern that is put on by any one wheel, as described in detail hereafter. The switching means may connect the wheels to the electric supply in turn, so that the pattern comes unto the paper in the desired sequence.

By this means, a combination of any desired number of wheels and the requisite switching means, any desired length of metallized paper can be patterned in such a way that the width of the electrodes left thereon successively increases in an exactly similar manner to that which would be obtained had a single very large pattern wheel been used, the advantage of a plurality of relatively small wheels in tandem over a single large wheel being due to the ease of handling the smaller wheels in the machine and the reduced cost of the manufacture, while achieving a similar result to that of using a single large wheel.

Figure 5:
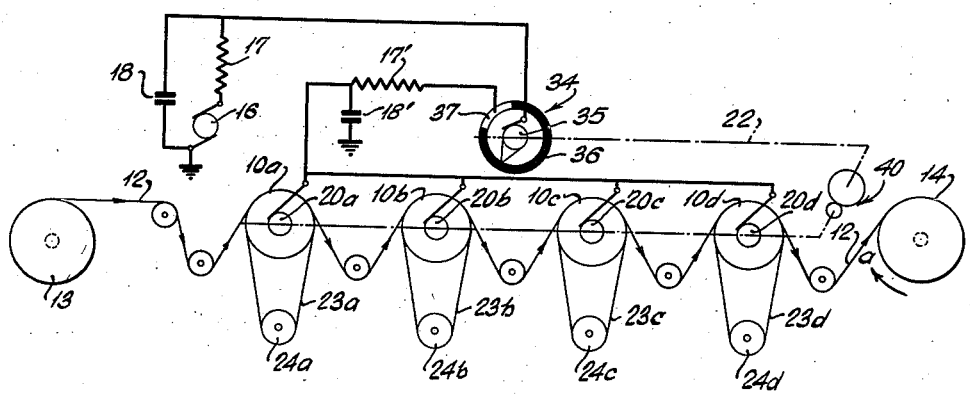
Figure 5 illustrates diagrammatically a modified form of patterning apparatus according to the invention.

Referring to Figure 5, there is shown a patterning system of the latter type, comprising four patterning wheels 10a, 10b, 10c and 10d and a switching arrangement cooperating therewith to enable the use of masks 23a, 23b, 23c and 23d of a length equal to only twice the periphery p of one of the wheels. Without the switching arrangement, the length of the masks would have to be four times the periphery p in accordance with the general rule given hereinabove. In the example shown in Figure 5, the switching device 34 comprises a rotating contact 35 operated in synchronism with the wheels 10a, 10b, 10c and 10d by the aid of a suitable coupling device 22 and speed-change gear 40 to cause the contact 35 to rotate at a speed equal to one-fourth the speed of the patterning wheels. The contact 35 which is connected to the electric source 16 cooperates with a segmental stationary contact 37 connected to the patterning wheels and being so designed as to connect the wheels to the electric source during one full revolution, corresponding to a quarter revolution of the contact 35, and to disconnect the wheels from the electric source during the succeeding three revolutions, or in general n—1 revolutions in case of n wheels. For this purpose, the switch may comprise contacting and insulating segments 37 and 36 having angular dimensions of 90° and 270°, respectively, as shown in the drawing.

The wheels 10a, 10b, 10c and 10d are shown connected to the contact 37 of the switching device through a separate resistor 17' with a small by-pass capacitor 18' connected directly between the connections to the wheels and ground or the frame of the machine. These result in the clean burning away of the metallized coating on the paper as is well known.

Figure 6:
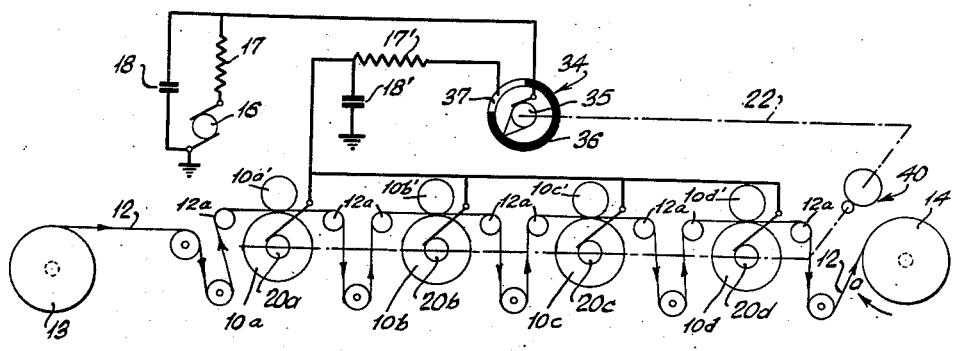
Figures 6 and 7 illustrate further modifications of multiple wheel patterning devices constructed in accordance with the principle of the invention.

Figure 6 shows an arrangement similar to Figure 5 wherein the masks 23a, 23b, 23c and 23d are omitted entirely and control of the patterning by the wheels 10a, 10b, 10c and 10d is effected exclusively by the switch 34 by connecting and disconnecting the wheels to and from the electric source 16 at the appropriate time. Again, all the wheels are connected to the source 16 during one revolution to burn successive sections of the pattern and result in a final resultant de-metallized zig-zag pattern on the strip, this active revolution being followed by three idle or inactive revolutions during which the source 16 is disconnected from the wheels, to advance the strip by a length sufficient to start a new patterning cycle or operation.

In arrangements according to Figure 6, where the use of masks is avoided altogether and replaced by synchronously operated switching means, it may be necessary to guide the strip 12 in such a manner that, instead of being wrapped around the peripheries of the wheels, it is brought close to the periphery substantially at the point only to avoid short-circuiting of the electrical supply, when switched on, by the contact of the metal coating of the strip with the wheel periphery. The guiding of the strip 12 may be readily accomplished by the use of auxiliary guide rollers 12a and auxiliary pressure rollers 10a', 10b', 10c' and 10d'. However, this guiding requirement will be unnecessary if the free or completely demetallized portions at the ends of a complete pattern equal or exceed the length of the wrapping arc or angle of the strip upon the wheels. Otherwise, the function and operation of Figure 6 is substantially similar to that of Figure 5.

If a different number of patterning wheels are used, the switch 34 is so designed as to connect the wheels to the source 16 during one revolution and to disconnect the wheels during n—1 revolutions, the speed-change gears 41 in this case being designed to reduce the speed of the switch 34 to $$\frac{1}{n}$$

times the speed of the patterning wheels, in the case of n wheels being used in tandem to burn a pattern of corresponding length upon the strip 12.

Figure 7:
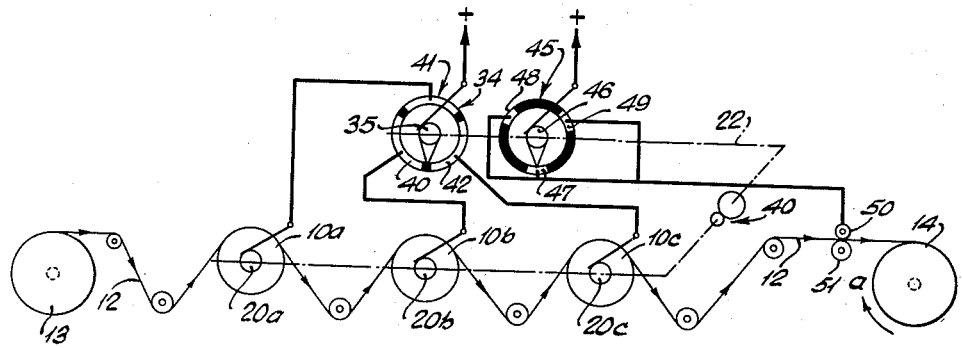

Instead of producing the sub-patterns from the various wheels simultaneously or consecutively, the patterning cycles by the wheels may be staggered or interlaced, in which case unpatterned portions between successive complete patterns may be avoided. An arrangement of this type is shown in Figure 7. The latter indicates diagrammatically an arrangement comprising three patterning wheels 10a, 10b and 10c, arranged in tandem with the paper web 12 passing over the surface of the wheels, in substantially the same manner as in the preceding illustrations. The electric source is simply indicated by the plus sign and may be similar as shown in the preceding figures. The switch 34 in the example shown again comprises a rotary switch arm 35 driven by a chain or other convenient form of coupling 22 by the wheels 10a, 10b and 10c through a speed change gear 41 designed to cause the switch arm to rotate at a speed ⅓ the speed of the wheels 10a, 10b and 10c which are preferably mechanically coupled to rotate in synchronism with each other. Switch 41, in the example shown, has three segmental stationary contacts 40, 41 and 42 each covering substantially an arc of 120° and being spaced by insulating segments, as shown in the drawing. Contacts 40, 41 and 42 are connected to the patterning wheels 10a, 10b and 10c, respectively, preferably through additional individual limiting resistors and by-pass capacitors (not shown) similar to those shown at 17' and 18' in Figures 5 and 6.

The operation of the device shown in Figure 7 is as follows: With the patterning wheels 10a, 10b and 10c properly adjusted in relation to one another and to the rotating contact 35 and with the latter rotating at ⅓ the speed of the wheels by the proper design of the speed-change gear 40, the sub-patterns upon the wheels will be burned upon the metallized strip 12 in succession, in such a manner that at first there will be applied the sub-pattern of the wheel 10b during the engagement of the contact 35 with the contact 40. During the next revolution of the wheels and engagement of the contact 35 with the contact 41, the sub-pattern of wheel 10a will be burned upon the strip 12 at a spacing distance from the previously burned sub-pattern equal to the length of the periphery p of the wheels, provided the wheels are so spaced or arranged in relation to the strip 12, as to provide spacing distances between successive wheels equal to the periphery p, in a manner readily understood. During the third revolution of the wheels, contact 35 engages contact 42, thus causing a burning of the partial pattern of the wheel 10c upon the intervening space between the patterns previously burned by the wheels 10a and 10b.

As a result, a complete continuous pattern comprising the sub-patterns of all three wheels will be burned during each successive three revolutions of the wheels by the proper sequence or interlace of the patterns by the switching device 41. Since only one of the wheels is connected to the voltage source at a time, special masking devices as required when the patterns are burned simultaneously may be dispensed with.

In addition to the synchronous switch 41, there is shown in Figure 7 an additional switch synchronized therewith and comprising a rotary contact 46 and cooperating stationary contacts 47, 48 and 49 all connected to an auxiliary roller or electrode 50 bearing on the metallized surface of the paper web 12. This small contact roller 50 presses the paper against a fixed roller such as 51 and, provided that the position of the contacts 47, 48 and 49 are suitably chosen, roller 50 may serve to burn away a portion A, Figure 2, of the metallization at the junction between each of the patterns applied by the successive wheels, so as to remove any risk of short-circuit arising should those successive patterns not register exactly with each other. Variations in the thickness of the paper tissue, for example, may cause small fluctuations in the positioning of the successive sub-patterns necessitating this burning away procedure between them.

Figure 8:
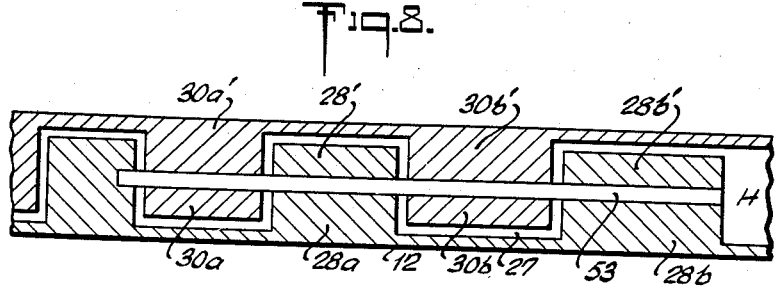
Figure 8 illustrates a method of controlling or adjusting the capacitance of a single-paper capacitor according to the invention.

If preferred, this auxiliary roller 50 need only be of a narrow width compared with the width of the paper web 12 or of the electrode areas patterned thereon, and it may also be used to perform a further auxiliary function of enabling the capacitance value to be pre-selected or adjusted within certain limits at different values below the total obtainable by the number of wheels installed on the patterning machine. For example, as is shown in Figure 8 which represents the end portion of the patterning of a paper strip 12 with the zig-zag pattern 27 showing steadily increasing electrode widths from left to right of the diagram, the normal pattern finishes at the point H where the metallization is burnt away completely.

By connecting the auxiliary small electrode wheel 50 to the voltage supply, which should be separate from the voltage supply for the branding wheels to prevent short-circuits, at the appropriate time, a strip 53 will be burnt away on the pattern, to thereby sever the electrodes 30a, 28a, 30b, 28b by cutting off therefrom the portions 30a', 28a', 30b', 28b', respectively. In this way, the mutual capacitances between the electrodes 30a, 28a, 30b and 28b will be entirely lost since the remaining portion of electrode 28b will, for example, come opposite to the cut off portion of 30b and will therefore virtually have no capacitance to the other pole of the condenser. Similarly, the cut off portion 28b' will come opposite to the residual portion 30b' and the capacitance thereof which would normally be added to that of the total capacitance will thereby be lost. The electrification of this auxiliary roller 51 in this manner for any desired length of time controlled by a suitable switching device, therefore provides a ready means of adjusting the capacitance of the finished condenser wound up from the patterned strip of metallized paper.

Thus, when using a switch 45 like that shown in the drawing, the contacting segments may be so designed as to burn away a strip 53 of desired length, to control the capacitance accordingly. Other switching devices may be provided for selective connection to the roller if a different capacitance change is required.

Figure 9:
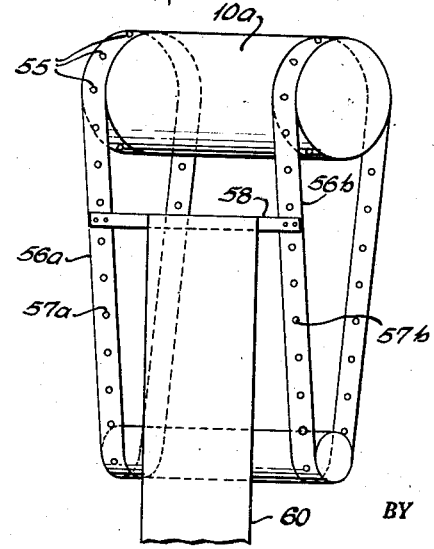
Figure 9 shows an improved drive for operating the controlling mask embodied in Figures 1 and 5.

Referring again to the masking arrangement already described in connection with Figure 1, an alternative and sometimes more convenient arrangement, is indicated diagrammatically in Figure 9. In this diagram the patterning wheel 10a is provided with projecting pegs or teeth 55, etc., disposed around its periphery, preferably adjacent to the two ends of the cylindrical wheel. Around these ends and meshing with the pegs or teeth are disposed two bands 56a and 56b provided with suitably placed holes 57a and 57b, respectively. Between these two bands is a further strip of thin stiff material 58 attached to both of them over which a strip 60 of masking material such as of paper, plastic or the like, is folded at its upper end and attached by any convenient means. This strip 60 will, therefore, be carried around the patterning wheel 10a due to the rotation of the latter and by cutting it to the appropriate length it will ensure the exposure to the metallized paper strip of the pattern on the patterning wheel 10a for the desired length of time during 2, 3 or more rotations as selected, depending upon the number of patterning wheels installed in the machine.

By this means using the perforated strips 56a, 56b not only is the mask 60 retained in synchronism rotation with the patterning wheel 10a but the mask itself can readily be replaced if at any time it is desired to alter its length to suit a change in the number of wheels installed in the machine, or to replace it after use for a prolonged period of time during which it may become mechanically abraded. A simple masking strip of, for example, kraft paper of a few mils thickness is readily attached to the strip 58 and provides a convenient form of mask for this purpose and one which is readily renewable at negligible cost.

It will be appreciated from the description given above that if it is desired to vary the capacitance of the condenser to be wound up from the strip of patterned metallized paper, the number of wheels installed in the machine can be altered as desired, for example, if four wheels are used a total capacitance of approximately three-quarters of the maximum may be obtained by reducing the number to 3, or of approximately half only of the capacitance by reducing the number to 2. Adjustment of the capacitance value intermediate between these major steps can be obtained by means of an auxiliary contact roller 50 as indicated and described already in connection with Figures 4 and 6.

It will be appreciated also that, in lieu of a separate mask or masking strip for each of the patterning wheels, a common mask travelling around all of them in turn may be used provided that its length is suitably adjusted to the number of wheels and the length of strip to be patterned.

Furthermore, any or all of the masks may have a plurality of openings, but in general a single one is usually to be preferred, particularly if used in combination with the electrical switching means. When the masking arrangement of Figure 5 is employed a single opening is normally only obtained, this opening representing the difference in length between the actual masking strip used and the length of $n$ times the periphery of the patterning wheel where $n$ represents the number of wheels in use in the machine at that time.

While there are above disclosed a limited number of embodiments of the structure, process and product of the invention, it will be evident that modifications and variations, as well as the substitution of equivalent elements and steps for those disclosed for illustration, may be made without departing from the inventive concept herein disclosed and defined in the appended claims, and it is desired therefore that the specification and drawings be regarded in an illustrative rather than in a limiting sense.

I claim:

1. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of electric branding wheels each having a raised peripheral projection corresponding to different fractional patterns of the complete pattern to be produced, means for passing said strip with its coated surface in successive contact with said wheels, means for applying an electric potential difference between said wheels and the coated surface of said strip, and means for controlling the current passing between said strip and said projections, to produce a complete continuous pattern comprised by the adjoining partial patterns burned individually by said wheels.

2. In apparatus for fabricating wound electrical capacitors of the type comprising a single metallized insulating strip having a linear zigzag shaped uncoated pattern running along the length thereof to provide successive electrode portions alternatively connected to opposite longitudinal metallized margins of the strip forming electrodes of opposite polarity, said electrode portions being located one above the other in mutual capacitative relation in the final winding of the strip, means for patterning a uniformly coated strip preparatory to its winding into a capacitor unit comprising a plurality of electric branding wheels each having raised peripheral projections corresponding to different fractional patterns of the complete pattern to be produced, means for passing said strip with its coated surface in successive contact with said projections, means for applying an electric potential difference between said wheels and the coated surface of said strip, means for controlling the current passing between said strip and projections, to produce a complete continuous pattern comprised by the adjoining partial patterns individually burned by said wheels, and further means for burning free areas within said margins and between adjacent partial patterns of the complete patterns burned upon said strip.

3. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of electric branding wheels each having a raised peripheral projection corresponding to different fractional patterns of the final complete pattern to be produced, means for passing said strip with its coated surface in successive contact with said projection, further means for applying an electric potential difference between said wheels and the coated surface of said strip, means for controlling the current passing between said strip and wheels, to produce a complete continuous pattern comprised by the adjoining partial patterns individually burned by said wheels, and further means for burning away a line of desired length intersecting the zig-zag pattern upon said strip.

4. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of equal-sized electric branding wheels each having a raised peripheral projection shaped according to a different fractional portion of the complete pattern to be produced, means for successively passing said strip around said wheels with its coated surface in contact with said projection, means for applying an electric potential difference between said wheels and the coated surface of said strip, and moving mask means interposed between said strip and wheels having open and solid portions, to control the burning of a continuous pattern upon said strip comprising the adjacent partial patterns individually burned by said wheels.

5. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of equal-sized electric branding wheels each having raised peripheral projections shaped according to a different fractional portion of the complete pattern to be produced, means for successively passing said strip around said wheels with its coated surface in contact with said projections, means for applying an electric potential difference between said wheels and the coated surface of said strip, and switching means for controlling the potential application to said wheels, to burn successive continuous patterns upon said strip each comprised of the adjoining partial patterns burned individually by said wheels.

6. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of equal-sized electric branding wheels each having a raised peripheral projection shaped according to a different fractional portion of the complete pattern to be produced, means for successively passing said strip around said wheels with its coated surface in contact with said projections, means for applying an electric potential difference between said wheels and the coated surface of said strip, moving mask means interposed between said strip and said wheels having open and solid portions, and switching means for controlling the potential application to said wheels, said masking and switching means cooperating to burn successive continuous patterns upon said strip each comprised of the adjoining partial patterns burned individually by said wheels.

7. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of equal-sized electric branding wheels each having raised peripheral projections shaped according to a different fractional portion of the complete pattern to be produced, means for successively passing said strip around said wheels with its coated surface in contact with said projections, means for applying an electric potential difference between said wheels and the coated surface of said strip, a plurality of endless flexible insulating moving masks each interposed between said strip and one of said wheels, said masks having openings to control the electric current passing between said wheels and strip, to thereby burn successive continuous patterns upon said strip each comprised of the adjoining partial patterns burned by said wheels individually.

8. In apparatus for fabricating wound electrical capacitors of the type comprising a single metallized insulating strip having a linear zigzag shaped uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of equal-sized electric branding wheels each having raised peripheral projections corresponding to a different fractional portion of the complete pattern to be produced, means for successively passing said strip around said wheels with its coated surface in contact with said projections, means for applying an electric potential difference between said wheels and the coated surface of said strip, means to rotate said wheels in substantial synchronism with one another, said wheels being arranged at distances from one another along said strip equal to the periphery of one of the wheels, a plurality of endless flexible insulating moving masks each interposed between said strip and one of said wheels, said masks having a length equal to the periphery of said wheels multiplied by the number of the wheels used and each being provided with a cut-out having a length equal to said periphery and said masks being adjusted in relation to said wheels and to one another, to burn successive continuous patterns upon said strip each comprised of the adjoining partial patterns burned by said wheels individually.

9. In apparatus for fabricating wound electrical capacitors of the type comprising a single metallized insulating strip having a linear zigzag shaped uncoated pattern running along the length thereof to produce successive electrode portions of opposite polarity and varying pitch so as to be located one above the other in mutual capacitative relation in the final winding of the strip, means for patterning a uniformly coated strip preparatory to its winding into a capacitor unit comprising an even number, greater than two, of electric branding wheels each having raised peripheral projections corresponding to a different fractional portion of the complete pattern to be produced, means for passing said strip in succession over said wheels with its coated surface in contact with said projections, means for applying an electric potential difference between said wheels and the coated surface of said strip, further means to cause said wheels to rotate in substantial synchronism with one another, said wheels being arranged at distances from each other along said strip equal to the periphery thereof, a plurality of endless flexible insulating moving masks each interposed between said strip and one of said wheels, said masks having a length equal to twice said periphery and provided with cut-out portions of a length equal to said periphery, and switching means for controlling the potential application to said wheels, said masks cooperating with said switching means, to burn successive complete patterns upon said strip each comprised of the adjoining partial patterns burned by said wheels individually.

10. In apparatus for fabricating wound electrical capacitors of the type comprising a single metallized dielectric strip having a linear sinuous and uncoated pattern running along the length thereof to provide successive electrode portions of opposite polarity so as to be located one above the other in mutual capacitative relation in the final winding of the strip, means for patterning a uniformly coated strip preparatory to its winding into a capacitor unit comprising a plurality of electric branding wheels each having peripheral projections shaped according to a different fractional portion of the complete pattern to be burned upon said strip, means for passing said strip around said wheels in succession, while causing said wheels to rotate in substantial synchronism with one another, means for applying an electric potential difference between said wheels and the coated surface of said strip, and means for controlling the electric current passing between said projections and said strip, to burn a continuous pattern upon said strip comprised of the adjoining partial patterns burned individually by said wheels.

11. In apparatus for fabricating wound electrical capacitors of the type comprising a single metallized dielectric strip having a linear sinuous and uncoated pattern running along the length thereof to provide successive electrode portions alternately connected to opposite marginal metallized areas of the strip forming electrodes of opposite polarity, said electrode portions being located one above the other in mutual capacitative relation in the final winding of the strip, means for patterning a uniformly coated strip preparatory to its winding into a capacitor unit comprising a plurality of electric branding wheels each having peripheral projections shaped according to a different fractional portion of the complete pattern to be produced, means for passing said strip around said wheels in succession while causing said wheels to rotate in substantial synchronism with one another, further means for applying an electric potential difference between said wheels and the coated surface of said strip, means for controlling the electric current passing between said projections and said strip, to burn a continuous pattern upon said strip comprised of the adjoining partial patterns burned individually by said wheels, and further means for burning free spaces within said marginal areas and between adjacent partial patterns burned by said wheels.

12. In apparatus for fabricating wound electrical capacitors of the type comprising a single meallized dielectric strip having a linear sinuous and uncoated pattern running along the length thereof to provide successive electrode portions of opposite polarity and varying pitch so as to be located one above the other in mutual capacitative relation in the final winding of the strip, means for patterning a uniformly coated strip preparatory to its winding into a capacitor unit comprising a plurality of electric branding wheels each having peripheral projections shaped according to a different fractional portion of the complete pattern to be burned upon said strip, means for passing said strip around said wheels in succession while causing said wheels to rotate in substantial synchronism with one another, means for applying an electric potential difference between said wheels and the coated surface of said strip, means for controlling the electric current passing between said projections and said strip, to burn a continuous pattern upon said strip comprised of the adjoining partial patterns burned individually by said wheels, and further means for burning away a central longitudinal line intersecting a plurality of adjacent electrode portions upon said strip.

WILLIAM DUBILIER.

References Cited in the file of this patent

UNITED STATES PATENTS

| Number | Name | Date |
|---|---|---|
| 751,527 | Marr | Nov. 9, 1904 |
| 1,909,079 | Steerup | May 16, 1933 |
| 2,216,558 | Ortlieb | Oct. 1, 1940 |
| 2,216,559 | Ortlieb | Oct. 1, 1940 |
| 2,385,246 | Wilsey et al. | Sept. 18, 1945 |
| 2,435,441 | Grouse | Feb. 3, 1948 |
| 2,549,966 | Grouse | Apr. 24, 1951 |